(12) United States Patent
Mese et al.

(10) Patent No.: US 11,184,560 B1
(45) Date of Patent: Nov. 23, 2021

(54) USE OF SENSOR INPUT TO DETERMINE VIDEO FEED TO PROVIDE AS PART OF VIDEO CONFERENCE

(71) Applicant: Lenovo (Singapore) Pte. Ltd., Singapore (SG)

(72) Inventors: John Carl Mese, Cary, NC (US); John Weldon Nicholson, Cary, NC (US); Kenneth Seethaler, Raleigh, NC (US); Adam Jerome Cavenaugh, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/124,461

(22) Filed: Dec. 16, 2020

(51) Int. Cl.
| | |
|---|---|
| *H04N 7/15* | (2006.01) |
| *H04N 5/268* | (2006.01) |
| *G10L 25/57* | (2013.01) |
| *H04N 5/262* | (2006.01) |
| *G10L 17/00* | (2013.01) |
| *G06K 9/00* | (2006.01) |

(52) U.S. Cl.
CPC ......... *H04N 5/268* (2013.01); *G06K 9/00355* (2013.01); *G10L 17/00* (2013.01); *G10L 25/57* (2013.01); *H04N 5/2628* (2013.01); *H04N 7/15* (2013.01)

(58) Field of Classification Search
CPC .......... H04N 5/268; H04N 5/262; H04N 7/15; G06K 9/00; G10L 17/00; G10L 25/57
USPC ............................................. 348/14.01–14.16
See application file for complete search history.

(56) References Cited

U.S. PATENT DOCUMENTS

| | | | | |
|---|---|---|---|---|
| 9,113,032 | B1* | 8/2015 | Vander Mey | H04N 7/15 |
| 2007/0263076 | A1* | 11/2007 | Andrews | H04N 7/148 |
| | | | | 348/14.08 |
| 2010/0220172 | A1* | 9/2010 | Michaelis | H04N 21/23424 |
| | | | | 348/14.08 |
| 2013/0120522 | A1* | 5/2013 | Lian | H04N 7/15 |
| | | | | 348/14.08 |
| 2016/0050394 | A1* | 2/2016 | Segal | H04N 7/155 |
| | | | | 348/14.08 |
| 2018/0070008 | A1* | 3/2018 | Tyagi | G10L 17/00 |

* cited by examiner

*Primary Examiner* — Melur Ramakrishnaiah
(74) *Attorney, Agent, or Firm* — John M. Rogitz; John L. Rogitz

(57) ABSTRACT

In one aspect, a device may include at least one processor and storage accessible to the at least one processor. The storage may include instructions executable by the at least one processor to facilitate, at a first device, a video conference. The instructions may also be executable to determine, at the first device and based on input from at least one sensor, a first video feed for the video conference to provide. The instructions may then be executable to, based on the determination, provide the first video feed as part of the video conference.

20 Claims, 8 Drawing Sheets

SETTINGS

- ENABLE PROACTIVE VIDEO FEED SWITCHING — *1002*

- OVERLAY ORGANIZATIONAL INFO. AND OTHER AVAILABLE INFO — *1004*

SWITCH VIDEO FEED BASED ON:

- SPOKEN NAME — *1006*
- QUESTION ASKED
- MOUTH OPENING
- PARTICIPANT LEANING TOWARD CAMERA
- PARTICIPANT RAISING OWN HAND
- PATTERNS

DEFAULT FEED: — *1008*

- ORGANIZER
- PARTICIPANT SPEAKING THE MOST
- SUPERIOR / HIGHEST-RANKING PERSON ORGANIZATIONALLY

FIG. 10

USE OF SENSOR INPUT TO DETERMINE VIDEO FEED TO PROVIDE AS PART OF VIDEO CONFERENCE

FIELD

The present application relates to technically inventive, non-routine solutions that are necessarily rooted in computer technology and that produce concrete technical improvements.

BACKGROUND

As recognized herein, video conferencing is becoming increasingly popular in modern society. Video conferencing might include two or more in-person participants on one end of the video conference and one or more remotely-located users on other end(s). Or the video conferencing might include two or three or even more participants all located remotely from each other and streaming audio/video feeds to each other to communicate audibly and visually with each other over the Internet or another network.

As also recognized herein, some video conferencing systems for either situation above can switch between different video feeds based on which participant is currently speaking, such that only one participant's video feed is presented at a given time to the other participants. However, as also recognized herein, current electronic video conference systems only reactively switch to the video feed of the speaking participant after that participant has been identified as speaking. This can lead to the video feed for the speaking participant not being presented until well after the participant begins speaking. In turn, this can lead to disjoined video conferencing, missed communications, and other problems specifically arising in electronic video conferencing. Accordingly, the present disclosure recognizes that there are currently no adequate solutions to the foregoing computer-related, technological problem.

SUMMARY

Thus, in one aspect a first device includes at least one processor and storage accessible to the at least one processor. The storage includes instructions executable by the at least one processor to facilitate a video conference, and to identify a first participant of the video conference for which to provide first video based on input from at least one sensor. The instructions are also executable to, based on the identification, switch from providing second video of a second participant as part of the video conference to providing the first video of the first participant as part of the video conference. The first video is different from the second video and the first participant is different from the second participant.

In some example implementations, the at least one sensor may include a microphone. In these implementations, the instructions may be executable to identify the first participant for which to provide the first video based on input from the microphone. So, for example, the input from the microphone may indicate a third participant audibly referring to the first participant by name and/or indicate a question being asked. The third participant may be the same as or different from the second participant.

Also in some example implementations, the at least one sensor may include a camera. In these implementations, the instructions may be executable to identify the first participant for which to provide the first video based on input from the camera. So, for example, the input from the camera may indicate a third participant gesturing toward the first participant, indicate the first participant as opening the first participant's mouth, indicate the first participant as leaning toward the camera as generating the first video, and/or indicate the first participant making a gesture with one of the first participant's hands. Again the third participant may be the same as or different from the second participant.

Additionally, in some example embodiments the first video may be generated by a first camera, and the second video may be generated by a second camera different from the first camera.

Further, note that in some example implementations providing of the first video may include streaming the first video from the first device to a second device different from the first device. But in other example implementations, the first device may include a display accessible to the at least one processor and the providing of the first video may include presenting the first video on the display.

In another aspect, a method includes facilitating, at a first device, a video conference. The method also includes determining, at the first device and based on input from at least one sensor, a first video feed for the video conference to provide. The method then includes, based on the determining, providing the first video feed as part of the video conference.

In some examples, the first video feed may include a video feed of a whiteboard and/or a video feed of a slide presentation.

Also in some examples, the first video feed may include a zoom-out of a second video feed, and/or a pan from a first conference participant to a second conference participant as located together in a conference room or other physical location.

Additionally, if desired the method may include providing a default video feed based on not being able to determine, at the first device, a video feed to provide. The default video feed may be associated with an organizer of the video conference, a first participant of the video conference who has been determined to speak more than at least one other participant during the video conference, and/or a second participant determined to be a workplace superior.

Additionally, in some example implementations the method may include determining, based on the input from the at least one sensor, a pattern for providing video feeds. In these implementations, the method may then include sequentially providing, as part of the video conference, different video feeds over time according to the pattern.

In still another aspect, at least one computer readable storage medium (CRSM) that is not a transitory signal includes instructions executable by at least one processor to facilitate, at a first device, a video conference. The instructions are also executable to determine, based on input from at least one sensor, a first video feed for the video conference to provide. The instructions are then executable to, based on the determination, provide the first video feed as part of the video conference.

Thus, in some example implementations the at least one sensor may include a camera and the instructions may be executable to determine the first video feed based on input from the camera. The input from the camera may indicate the first participant going from not looking at a display to looking at the display.

The details of present principles, both as to their structure and operation, can best be understood in reference to the accompanying drawings, in which like reference numerals refer to like parts, and in which:

BRIEF DESCRIPTION OF THE DRAWINGS

FIG. 10 shows an example graphical user interface (GUI) that may be presented on the display of a device to configure one or more settings related to video conferencing consistent with present principles.

DETAILED DESCRIPTION

Figure 1:
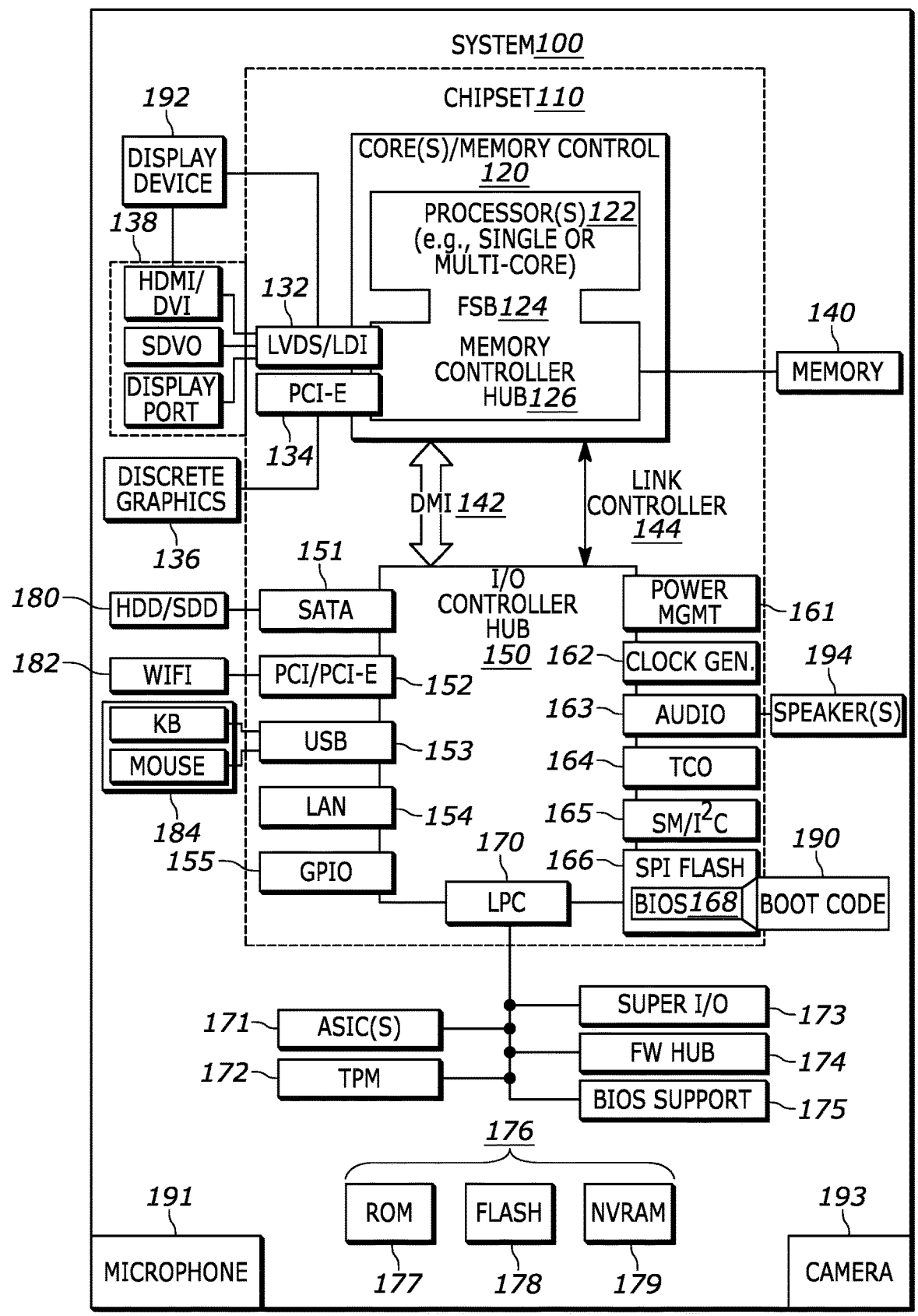
FIG. 1 is a block diagram of an example system consistent with present principles.

Among other things, the present disclosure describes devices that can leverage data present during conference device usage to dynamically change how camera feeds are utilized during the video conference. Additionally, speech during the meeting may be processed in order to perform speaker identification (ID). The speaker ID initially might only be anonymous in that names may not be identifiable in certain circumstances but the device can still ID participants based physical position within a conference room and switch video feeds accordingly.

However, in some circumstances speaker ID may be further enhanced if information about the participants is available, such as existing speech models and/or organizational information from which a speaker's name and other information may be identified. The information could be seeded by pre-fetching the relevant data based on who is electronically invited to the meeting (e.g., via an electronic calendar invite accessible to the system). If enhanced information is available for a given participant who is speaking, that individual may have an overlay presented (on their respective video feed) of who they are and what their position is organizationally. For example, "supervisor" or "boss" or "director" could be indicated on the overlay, as well as respective titles for subordinates. A participant may even be designated as an "uninvited" participant or "external/vendor guest" if there is no info available. An "anonymous" designation or codename that a respective participant might have used to access the video conference may also be presented in the absence of other info.

Additionally, in some examples to identify people by name and to present that and other information as part of the overlay, every participant of the conference (whether in a same physical location or not) may join the conference using in the conferencing system's software (e.g., without joining/providing respective audio). But even in this example, a name of the participant and other information may still be available (e.g., based on prestored data provided through the software and/or logon information used to login to the conference). Thus, various means could be used to associate a room's video feed or other feed with a given user and/or name.

Still further, in some examples there may be another level of speaker identification between affirmatively naming/identifying a particular voice (and hence name of the person) and using physical position, which may be distinguishing between voices without being able to identify the speakers by name to still switch between video feeds. This may include speaker diarization, without speaker recognition.

As for dynamically changing how camera feeds are utilized during the video conference, speech during the video conference as indicated in microphone input may be processed to proactively identify when to transition the video focus. For example, responsive to a user asking a question to another individual, the primary spotlight video feed or only video feed presented at each participant's device may naturally segue from the speaker to the person to whom the question was directed. This may be done by buffering video of the subsequent video feed prior to the switch and then fading from one feed to the other for a visually smooth transition. Or, a same camera feed could be zoomed out if the device could fit both participants in the same view. Or a split screen composite of the two people as shown in two different camera feeds may be presented to give other participants a view of a back-and-forth discussion between the two.

Further, in some examples if a switch is to be made from one feed to another, the system may institute a slight time delay before presenting a feed for a less-frequent speaker, whereas a more-frequent speaker may have his/her feed presented right away upon detecting a trigger to transition to providing that feed. The time delays may be proportional to the amount of time or amount of words that each participant speaks. For example, a least-frequent participant may have a switch to his/her feed delayed by a threshold amount of three seconds, a moderately frequent participant may have a switch to his/her feed delayed by a threshold amount of one second, and the feed for a most-frequent speaker may be immediately switched to upon a system determination to switch feeds.

Additionally, note that participant speech may also be analyzed based on microphone input to identify verbal cues to switch to a whiteboard feed (e.g., "let's whiteboard this") or redirect to a PowerPoint slide (e.g., "as you can see on this slide"). This might be useful, for example, for lectures or presentations to switch between the written material being presented and the speaker himself or herself.

Still further, in addition to detecting verbal cues from speech, a device operating consistent with present principles may also detect visual body-language cues using camera input to trigger a switch in feeds. The detectable body-language may include a participant sitting up, the participant leaning in toward his/her camera, the participant opening his/her mouth, and/or the participant making hand gestures. Based on detecting any of those cues, the device may change the camera view or feed proactively. Note that body language cues may be based on the person who wants to speak next, or the person who is already talking but gesturing towards another person for which a feed is to be presented.

Body language detection and/or gesture recognition could be used for remote participants as well as co-located participants who might be in the same room as each other.

Additionally, note that patterns may also be identified for determining a feed to which to switch. For example, detection of "around the room" personal introductions or updates may occur and the system may switch video feeds accordingly.

Still further, in some example when the system is "at rest" in that there may be no speech currently occurring for the system to process, the system may provide/focus on the feed of the person who organized the conference, the person speaking the most during the conference, or a highest-ranking person according to a hierarchical organization chart.

Thus, in one example, a system operating consistent with present principles may provide and switch between video feeds generated by respective cameras at a same physical location, such as different cameras all located within a same conference room. In another example, all conference participants may be remotely-located from each other so that the respective locations of the participants (and hence respective cameras) are beyond sight and sound of each other (e.g., separated from each other by a mile or more), and video feeds may still be provided or switched between as described herein.

Furthermore, regardless of whether two or more participants are located together at one location or whether all participants are remotely-located, which video feed to show in "the big box" for the primary video feed and/or which video feeds to show in or promote up to the "top 4" feeds actually presented on a conferencing GUI may still be determined as set forth herein such as based on camera and/or microphone input (e.g., where there are more than four participants participating and hence more than four feeds are actually available but not all feeds are presented on the GUI).

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java®/JavaScript, C # or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include an audio receiver/microphone 191 that may provide input from the microphone 191 to the processor 122 based on audio that is detected, such as via a user providing audible input to the microphone as part of a video conference consistent with present principles. The system 100 may also include a camera 193 that gathers one or more images and provides the images and related input to the processor 122. The camera 193 may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video that may be used for video conferencing consistent with present principles.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
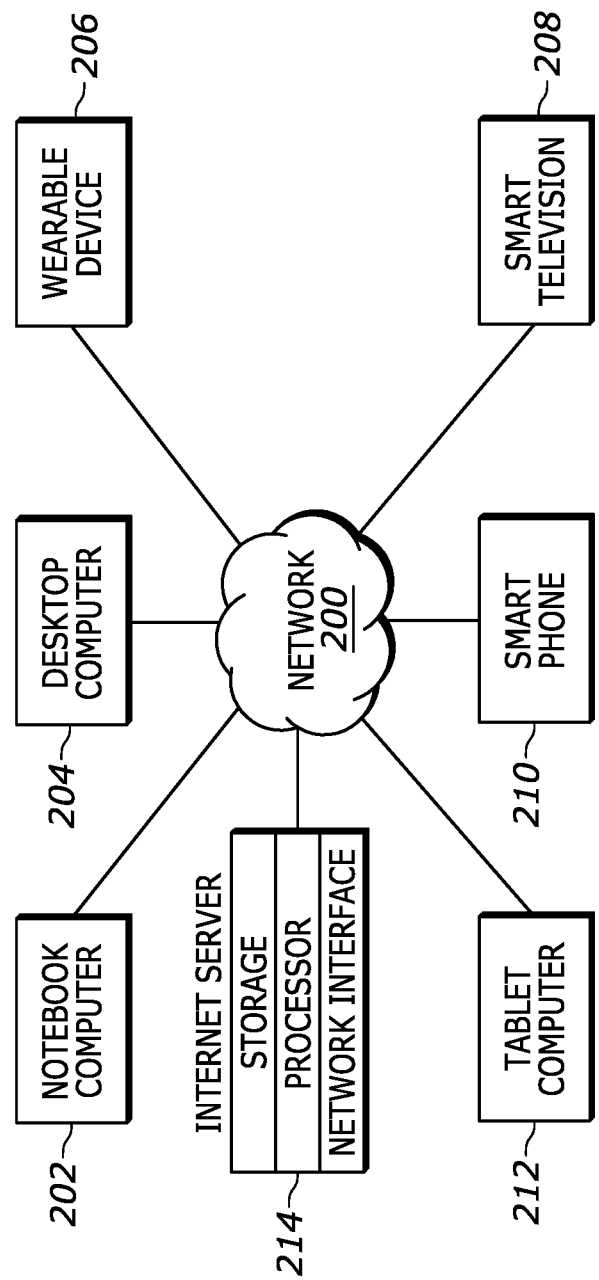
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles, including facilitating video conferencing.

Figure 3:
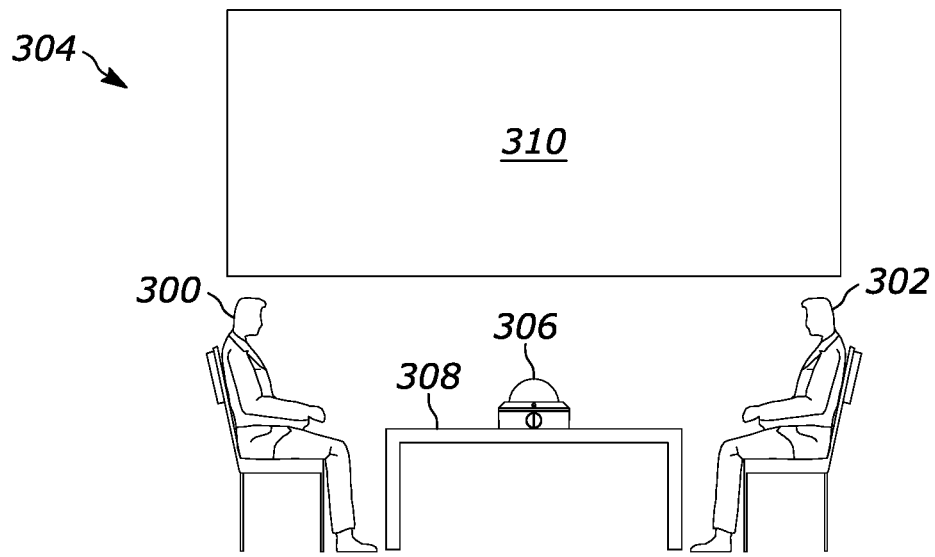
FIG. 3 is an illustration of video conference participants as located together in-person while conferencing with one or more remotely-located participants consistent with present principles.

Now describing FIG. 3, it shows a video conferencing example to illustrate present principles. As shown, a first video conference participant 300 and a second video conference participant 302 are located together in a conference room 304 or other physical location. A three-hundred sixty degree camera 306 sits on a table 308 in the conference room 304 and is being used to stream respective video feeds of the faces of the participants 300, 302 to one or more additional, remotely-located participants (not shown in FIG. 3). Depending on who is talking in the video conference, a video feed of the talker may be presented on a display 310 in the room 304 (such as a TV or OLED display mounted on a wall within the room 304 and that may have its own camera for use consistent with present principles) as well as on the displays of the remote-located participant devices. The talker may be one of the participants 300, 302 or one of the remotely-located participants. The different video feeds that may be presented according to this example are shown in FIG. 4.

Figure 4:
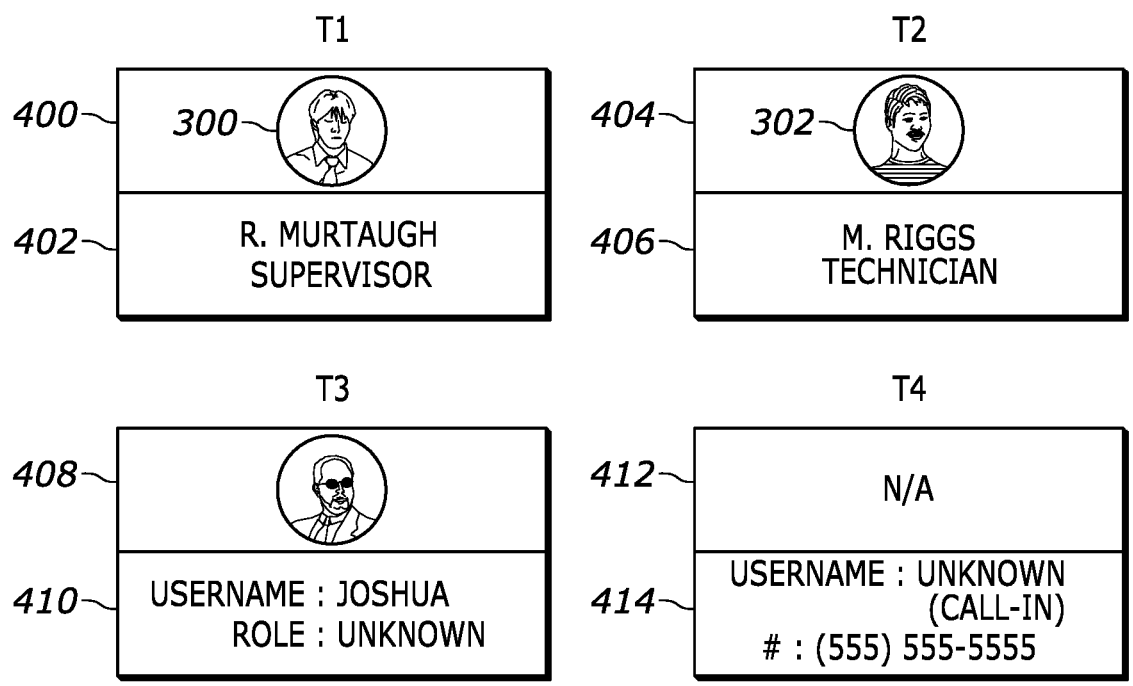
FIG. 4 shows different video feeds of a video conference that may be presented at different times consistent with present principles.

Accordingly, as shown in FIG. 4 and at a first time designated "T1", a video feed 400 of the participant 300 is presented on the displays of each device being used for video conferencing, including the display 310 and the displays of any remotely-located participants (e.g., a laptop or smartphone display being used for video conferencing). Note that the video feed 400 of the participant 300 may be presented based on the video conferencing system determining that the participant 300 is actively speaking as part of the video conference.

As also shown, in some examples a graphical overlay 402 may be presented over top of the video feed 400 and indicate information about the participant 300. For example, when the participant 300 first began speaking during the conference, voice recognition may have been executed to identify the participant 300 by name using a previously-stored speech profile or speech sample for the participant 300. Or if the participant 300 logged on to the conference using a unique user ID and password, the name of the participant 300 may be identified from profile information associated with the user ID. Other ways of identifying the participant 300 may also be used, such as facial recognition using one or more frames of the video feed 400 and a database of pre-stored faces and associated names.

Additionally, note that in some examples once the participant 300 has been identified, additional pre-stored information about the participant 300 may also be presented as part of the overlay. This information may include a first initial and last name of the participant ("R. Murtaugh" for the overlay 402). The information may also include a title or organizational role for the participant 300 within a company, school, organization, etc. In this example, the participant 300 has been identified as a supervisor.

FIG. 4 also shows that responsive to a trigger, the conferencing system may proactively switch from providing the video feed 400 for the participant 300 to providing a video feed 404 at a later time designated "T2" for the participant 302. Thus, based on sensor input, the system may switch video feeds prior to detecting the participant 302 as actually speaking. The sensor input may include input from a camera indicating the participant 302 as opening his/her mouth (e.g., from a closed-mouth position or partially-closed position), cuing the system that the participant 302 is about to speak. The sensor input may also include input from a camera indicating the participant 300 as gesturing toward the participant 302 by pointing at the participant 302 with a right-hand index finger or other digit (since they are physically located in the same room 304), cuing the system that the participant 302 is about to speak. As another example, the trigger may be input from the camera indicating the participant 302 going from not looking at his or her own device's display to actually looking at the same display, indicating the participant 302 might have been doing something else but now has something to say and hence looks at his/her display.

As also shown for time T2, a graphical overlay 406 may be presented over top of the video feed 404 and indicate information about the participant 302. The participant 302 may have been identified similar to how the first participant 300 was identified as set forth above (as may any of the other video conference participants) in order to determine information to present as part of the overlay 406. Here the information may include a first initial and last name of the participant 302 and the participant's job title or organizational role. In this example, the participant 302 is identified as "M. Riggs" and has the title of technician.

Still in reference to FIG. 4, suppose that the participant 302 asks a question that is directed to a remotely-located participant different from the participants 300, 302. The question may include the name of the remotely-located participant for the system to identify that it should switch video feeds to the video feed for the remotely-located participant based on the name. For instance, the participant might ask, "Josh, what do you think?" Responsive to detecting the question as being directed toward the remotely-located participant Joshua, but before Joshua might begin to speak in response, the video feed presented on each conference participant's display may switch to Joshua's video feed 408 as shown in FIG. 4 at a third time T3 (that is after time T2 as represented in FIG. 4). Note here too that even though Joshua was referenced as "Josh" in the question, the system may correlate "Josh" to "Joshua" since it is part of the name "Joshua" and/or based on using a relational database that associates nicknames and shortened names with formal names.

Also note that while the video feed 408 is presented at each display, an overlay 410 of information about Joshua may be presented over top of the feed 408. In this example, the overlay 410 includes a username that Joshua used to login to the conferencing system for the conference, e.g., even if that name is different from Joshua's actual first and last name. Also according to this example, since the conferencing system was unable to identify a role or title for Joshua, possibly because none was made available, the overlay 410 may indicate "unknown" for Joshua's title.

Also in reference to FIG. 4, supposed that while the video feed 408 is being provided that another remotely-located participant that called into the video conference (e.g., an audio-only participant) is asked to provide his or her perspective on what is being discussed. Even though no real-time camera feed might be available for this participant since the participant called in over a telephone line and his/her device camera is therefore not being used to stream video, a placeholder image or video may be provided as video stream 412 responsive to the conferencing system identifying this participant as being asked to provide his or her perspective. Additionally, note that whatever information might be known about this participant can be concurrently provided as part of an overlay 414, including text indicating that the participant's name is unknown but that the participant called-in to the video conference as well as text indicating the phone number used to call in.

Figure 5:
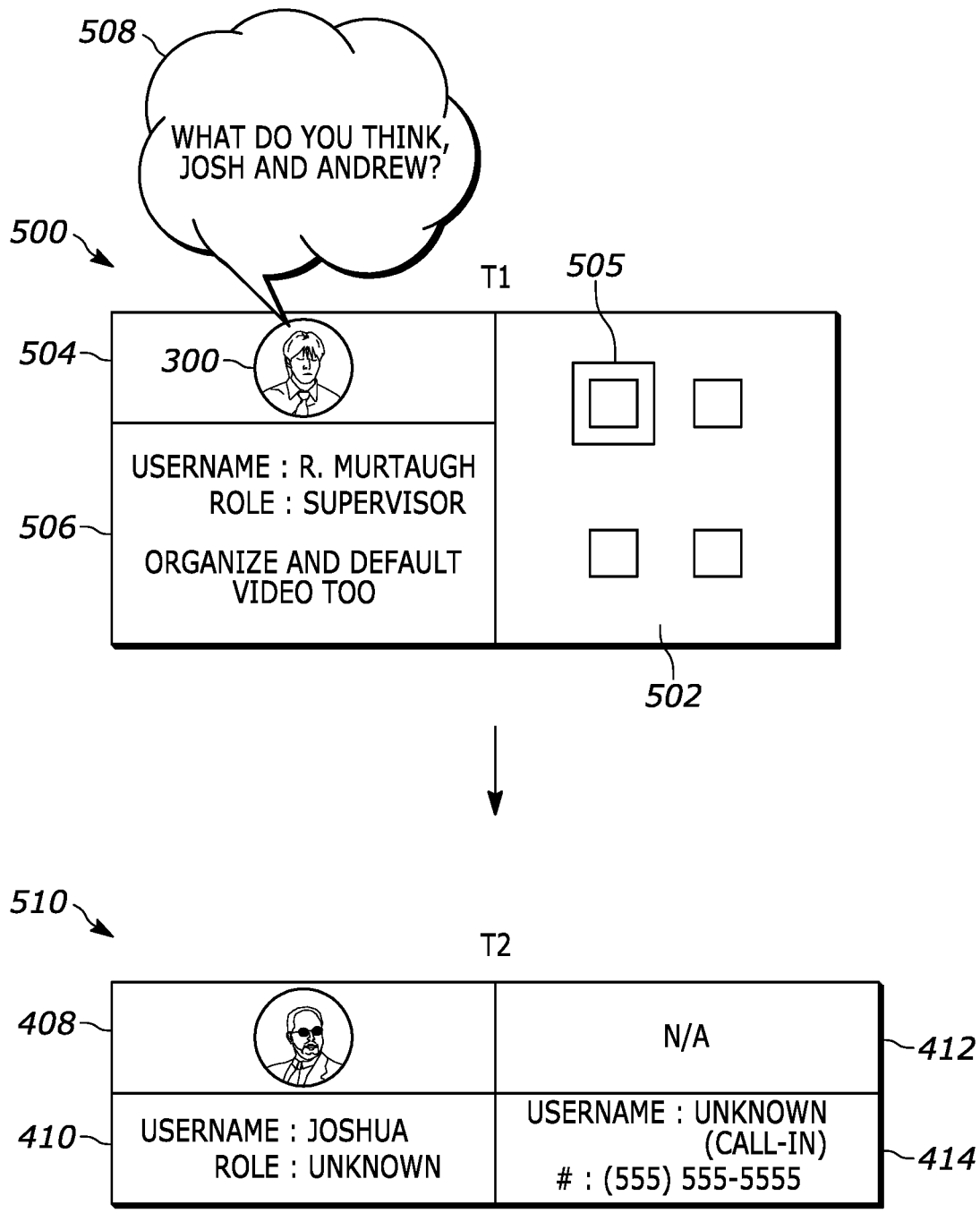
FIG. 5 shows a switch in the providing of video feeds of a video conference based on a question being directed to particular conference participants consistent with present principles.

Continuing now in reference to FIG. 5, it shows another example using the same participants as described above in reference to FIGS. 3 and 4. As shown, a graphical user interface (GUI) 500 as presented on the display of one or more end-user devices being used for conferencing may be presented at a first time T1. As also shown at time T1, thumbnail images 502 of each participant may also be presented on the GUI 500.

Also at time T1, a video feed 504 of the first participant 300 may be provided. An overlay 506 for the video feed 504 may further be provided. Again the first initial and last name of the participant 300 is listed as "R. Murtaugh" and the role is listed as a supervisor. Additionally, assume the participant 300 initiated the video conference and sent invites to the other participants, and so the participant 300 has been labeled as the organizer of the video conference.

Still further, note that the video feed 504 might have been provided at time T1 based on it being the default video feed for the video conference as will be described further below. Also note that since the video feed 504 is the primary video feed at time T1 and thus is presented larger than the thumbnails 402 (and larger any other video feeds that might be presented), it has been highlighted with an additional box 505 surrounding the corresponding thumbnail image 502 to indicate that it is the current video feed being provided on the left side of the GUI 500.

Thus, assume as an example per FIG. 5 that the participant 300, while speaking during the video conference, asks the question 508, "What do you think, Josh and Andrew?" This question may be detected by the microphone on the device of the participant 300 and provided to the video conferencing system that is facilitating the video conference (e.g., hosting the conference, merging the audio/video streams and routing those streams to other participants, etc.). The audio of the question may also be provided to the respective end-user devices that are also facilitating the video conference (e.g., by providing their respective audio/video streams) to be audibly presented at those devices. At this point, note that the video conferencing system itself might be executing at one of the end-user devices of one of the participants, and/or might be executing at a server coordinating the conferencing. But regardless, upon receiving the microphone input indicating "What do you think, Josh and Andrew?" and performing speech recognition and/or natural language processing on the input, the system may determine a question has been asked of the two people indicated in the question, Josh and Andrew.

Based on this, the system may determine to provide Josh's video feed based on Joshua being an identified participant. Additionally, the system may execute process of elimination to determine that since none of the other identified participants ("M. Riggs" and even "R. Murtaugh" himself) are named "Andrew", the unknown participant that called-in is likely "Andrew". Accordingly, the name Andrew may be saved and associated with the unknown participant for future use (e.g., on an overlay), and also the video feed for Andrew may be provided in response to the question.

Thus, responsive to detecting the question being asked to both Joshua and Andrew, and possibly before either of Josh or Andrew begin speaking, at time T2 the GUI 500 may be replaced with a split-screen or composite view GUI 510. As shown, the GUI 510 may show the real-time video feed 408 for Joshua (along with the overlay 410 for Joshua) in the left-hand column, as well as the real-time video feed 412 for the unknown participant (along with the overlay 414) in the right-hand column. Although not shown, also note that since "Andrew" has been identified as corresponding to the unknown participant, in some examples the "unknown" designation for the overlay 414 may be replaced with text for the name "Andrew".

Figure 6:
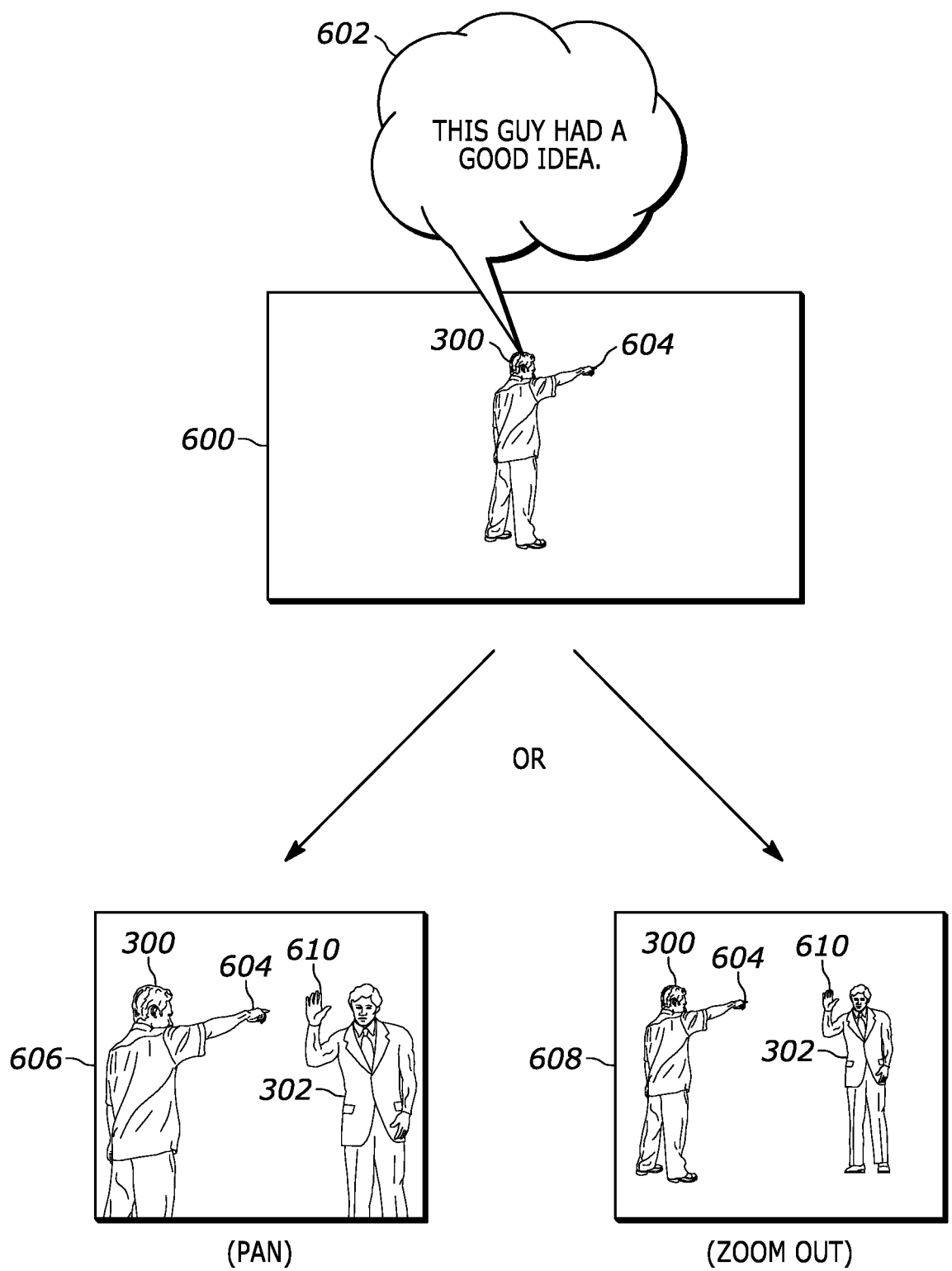
FIG. 6 shows a switch in the providing of video feeds of a video conference by panning or zooming out in relation to co-located video conference participants consistent with present principles.

Continuing the detailed description in reference to FIG. 6, it shows additional examples consistent with present principles. As shown in FIG. 6, a video feed 600 of the participant 300 is shown as may be presented on the display of the devices of other participants while the participant 300 speaks. As illustrated by speech bubble 602, the participant has spoken the words "This guy had a good idea." While speaking those words, the participant 300 also gestures a finger-pointing gesture 604 toward participant 302, who is located in the same physical location as the participant 300 but not currently shown in the video feed 600.

Thus, the conferencing system may use natural language processing to determine that the participant 300 is speaking about another person and then recognize the gesture 604 using gesture recognition software and camera input to determine that the participant 300 is pointing toward the participant 302. Additionally or alternatively, note that if the participant 302 performed a gesture 610 raising his or her hand, this gesture may also be recognized using gesture recognition to determine that the participant 302 is about to speak based on a hand-raise gesture being associated with a video feed switch (e.g., in a relational database being used for such purposes).

Accordingly, in response to the question and/or gesture(s), the conferencing system may provide a video feed 606 or 608 to the other participants, depending on user preferences or desired implementation. The video feed 606 may be a pan using a single camera that pans from left to right across real space (or right to left in other examples) to show a different field of view than initially shown in the video feed 600. Here, panning has been performed until the system identifies the participant 302 as being within the field of view of the same camera and hence shown in the video feed 606, and thus participants 300, 302 are both shown in the video feed 606.

In contrast but as also shown in FIG. 6, the video feed 608 may be a zoom out from the video feed 600, again as may be performed using the same camera as captured the video feed 600. Thus, per the zoom out, the participant 300 may still be shown in the feed 308 but at a smaller scale owing to the zoom out, and the zoom-out may continue until the participant 302 is also identified as being shown in the feed from the camera.

Figure 7:
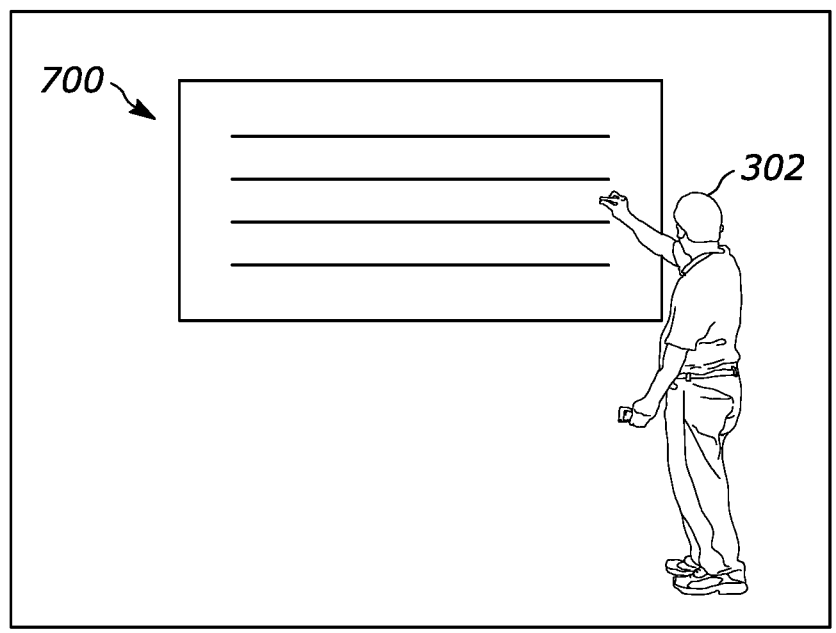
FIG. 7 shows a switch to a video feed of a whiteboard during a video conference consistent with present principles.

Referring now to FIG. 7, it shows another example consistent with present principles. For this example, suppose a video conference participant indicates "Let's look at the whiteboard" or otherwise refers to a tangible whiteboard 700 either currently or formerly shown in one of the video feeds of one of the cameras being used for video conferencing. For example, the camera showing the whiteboard 700 may be the camera 306 described above, and the whiteboard 700 may be located at the location 304.

Based on the conferencing system executing object recognition software to identify the whiteboard 700 from the camera input, and responsive to identifying an audible reference to "whiteboard" from one of the conference participants, a video feed 702 of the whiteboard 700 may be provided to the other participants. Additionally, note that while the whiteboard 700 is used in the present example, other objects such as a chalk board or other suitable writing surface may be identified and shown. Further note that writing surfaces themselves are not the only thing that might be identified and shown in a camera feed and that any other real-life object that a conference participant might ask the other participants to "look" at (or otherwise reference audibly) may be shown in a video feed in response.

Figure 8:
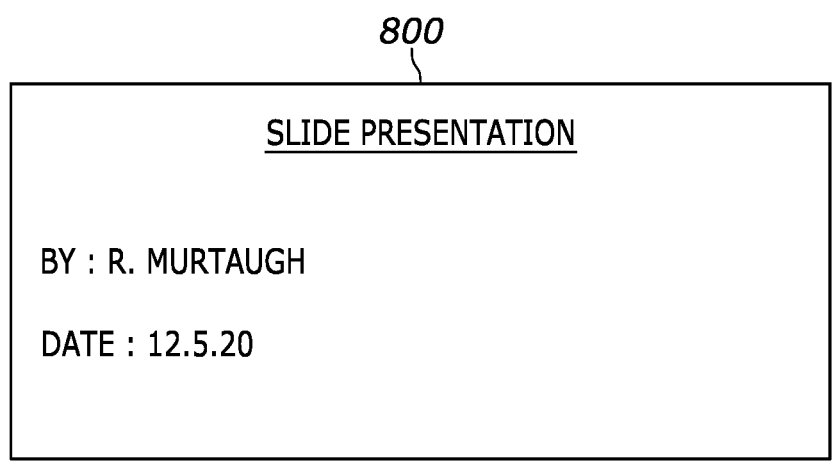
FIG. 8 shows a switch to a video feed of a slide presentation during a video conference consistent with present principles.

Moreover, note that video feeds of digital objects that a conference participant might refer to audibly and/or with a gesture can also be provided as a video feed in some examples. This is reflected in FIG. 8, where responsive to a participant saying "If you look at the slide presentation . . . ", a slide presentation 800 being shared amongst the participants as part of the video conference may be provided as the primary or only video feed shown to each participant at a certain time (e.g., rather than showing a video feed(s) of the participants themselves).

Figure 9:
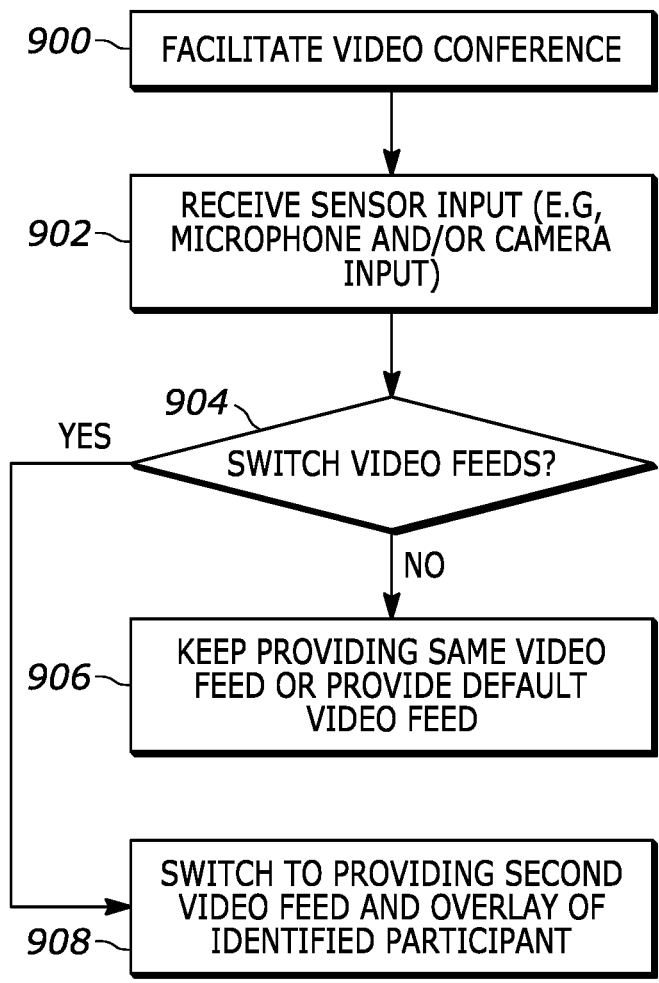
FIG. 9 shows a flow chart of an example algorithm that may be executed by a video conferencing system consistent with present principles.

Referring to FIG. 9, it shows example logic consistent with present principles. The logic of FIG. 9 may be executed, for example, in whole or in part by a device such as a server that facilitates a video conference among end-user devices and/or by one of the end-user devices themselves in any appropriate combination. Beginning at block 900, the device may facilitate a video conference. For example, if this step is being executed by a server, facilitating the video conference may include hosting the conference, merging the audio/video streams from the end-user devices and routing those streams to other end-user devices of other participants, etc. As another example, if this step is being executed by one of the end-user devices for a respective participant, facilitating the video conference may include executing video conferencing software locally at the device either through a web browser or independent software application, transmitting microphone input and camera input to other end-user devices (e.g., through the server or otherwise), presenting the audio/video streams of other participants at the end-user device, etc.

From block 900 the logic may move to block 902. At block 902 the device may receive input from one or more sensors, such as sensors on the device executing the logic of FIG. 9 and/or sensors on other devices in communication with the device executing the logic. For example, input from a camera and/or microphone may be received at block 902. From block 902 the logic may proceed to decision diamond 904.

At diamond 904 the device may determine, based on the sensor input received at block 902, whether to switch from providing a first video feed for a first participant to providing a second video feed for a second participant (or whether to otherwise provide a certain video feed such as a feed of a slide presentation). If this step is executed by a server, providing the second video feed may include streaming the second video feed in real-time to participant devices, and/or controlling presentation of the video conference at the respective end-user devices themselves to present the real-time second video feed. If this step is executed by one or more of the end-user devices themselves, providing the second video feed may include presenting the second video feed in real-time on the display of the end-user device itself.

Responsive to a negative determination at diamond 904, the logic may proceed to block 906 where the device(s) executing the logic may continue providing the same (first) video feed as it might already be providing, or the device may provide a default video feed as will be discussed further below. However, note that responsive to an affirmative determination at diamond 904, the logic may instead move to block 908 where the device may switch to providing the second video feed (e.g., at a same GUI location at which the first video feed was presented) and possibly overlay information of the identified, respective participant on the second video feed as described above. But note that in various examples and regardless whether the logic proceeds to block 906 or 908 from diamond 904, in either case the device may continue streaming audio from each participant's microphone to the other participants even if their respective video feeds are not presented.

As for the determination made at diamond 904, it may be based on a number of different things that may be identified from the sensor input. For instance, where the sensor input includes microphone input, the second participant for which to provide the second video feed may be identified based on input from the microphone as well as execution of voice recognition software, natural language processing software, and/or a digital assistant to identify another participant as audibly referring to the second participant (e.g., by name, by physical characteristics, by job title, etc.) and therefore trigger a switch to providing the second video feed showing the second participant. The microphone input may also indicate a question being asked to the second participant and therefore trigger a switch to providing the second video feed showing the second participant.

Additionally or alternatively, where the sensor input includes camera input (e.g., still images and/or video), the second participant for which to provide the second video feed may be identified based on input from the camera as well as execution of facial recognition software, gesture recognition software, object recognition software, and/or a digital assistant to identify another participant as gesturing toward the second participant (e.g., indicating the second participant might speak or that attention should be focused on the second participant) and therefore trigger a switch to providing the second video feed showing the second participant.

The camera input may also indicate the second participant making a gesture with one of the second participant's hands and therefore trigger a switch to providing the second video feed showing the second participant. Here, for example, the particular gesture may be identified using gesture recognition software and then a relational database may be accessed to determine whether the gesture is correlated in the relational database to a participant being about to or requesting to speak (and/or that the video feed should be switched to that participant anyway). For example, a hand raise or a finger raise may be correlated to a switch to the gesturing participant since the gesturing participant might have something to say based on the gesture, and therefore the device may switch to providing a video feed showing the gesturing participant.

As another example, the input from the camera may indicate the second participant as opening his or her mouth, which after being identified using facial or gesture recognition may also be correlated to switching video feeds to the second video feed of the second participant since the action of opening the mouth may indicate that the second participant might have something to say. As yet another example, the input from the camera may indicate the second participant as leaning toward the camera on his or her own device, and/or indicate the second participant going from not looking at his/her display to looking at his/her display, both of which may indicate that the second participant might have something to say and therefore the device may trigger a switch to providing the second video feed showing the second participant. The input from the camera might also indicate the second participant as going from a reclined sitting or lying down position to a sitting upright position (e.g., the axis of the second participant's spine being upright or near upright with respect to vertical), which may indicate that the second participant might have something to say and therefore the device may trigger a switch to providing the second video feed showing the second participant As still another example, suppose the first participant gestures toward a whiteboard as described above in reference to FIG. 7 or mentions the whiteboard in verbal speech. Responsive to camera input or microphone input, respectively, being used to identify as much, a video feed may be provided at block 908 showing the whiteboard itself (as may be identified using object recognition and images from a camera). This may be done by switching video feeds from one camera's feed to another camera's feed, by zooming out from one camera feed to show the whiteboard, by panning from left or right (and/or up or down) using one camera feed, or by providing a split-screen where at least one of the video feeds of the split-screen shows the whiteboard.

As but one more example, if one participant gestures toward his or her display while it presents a slide presentation, and/or if that participant refers to the slide presentation verbally by saying "slide presentation" or some other identifiable segment of speech, at block 908 the device may provide a video feed showing the slide presentation (e.g., rather than showing a camera feed of one or more participants) or by creating a split-screen showing the slide presentation in one of the split-screen windows even though it was not shown prior to the gesture or verbal cue.

Now describing FIG. 10, it shows an example graphical user interface (GUI) 1000 that may be presented on the display of a device configured to undertake present principles, such as a server or end-user device that might execute the logic of FIG. 9 and/or execute other functions described above. The GUI 1000 may be used to set or enable one or more settings of the device, and each of the options to be discussed below may be selected in this example by directing touch or cursor input to the respectively adjacent check box.

As shown, the GUI 1000 may include a first option 1002 that may be selected to set or enable the device to undertake present principles. For example, the option 1002 may be selected to set or configure the device to, in the future, undertake the logic of FIG. 9 and/or execute other functions described above to provide or switch between video feeds based on sensor input.

The GUI 1000 may also include a second option 1004 that may be selectable to set or enable the device to overlay name information, organizational information (e.g., work title like "supervisor"), and/or other available information on a video feed of a given participant associated with the information.

Still further, if desired the GUI 1000 may include respective options 1006 to select respective different types of triggers to use to switch or otherwise provide a different video feed than is currently being presented during a video conference. Any of the triggers discussed herein may be listed on the GUI 1000, but for illustration in the present example those triggers include a video conference participant's name being spoken, a question being asked of a respective participant, a respective participant's mouth opening, a respective participant leaning toward his/her camera, a respective participant raising his/her own hand, or patterns that might be recognized from the video conference itself.

Patterns that might be recognized to trigger a switch in video feeds (or to trigger the providing/presentation of a given video feed) might include, for example, detection of an "around the room" pattern that might occur at the start of a video conference or once status updates begin as part of the video conference. For example, speech from the organizer or another video conference participant can be parsed using natural language understanding (NLU) to identify the organizer as saying "let's go around the room" or "shall we start with introductions". In response to identifying such an utterance, the device may then determine a pattern or sequence in which video conference participants will speak. The sequence may be based in part on geography/physical location, such as in-person participants speaking in turn from left to right around a table (starting with the organizer), and then remote participants speaking in turn from left to right, up to down as presented on a video conference GUI (e.g., left to right, up to down according to the thumbnail images 502). Thus, video feeds may be sequentially provided over time (at different, adjacent times) according to the recognized pattern or sequence.

Additionally or alternatively, patterns may be detected based on sound source localization and/or computer vision, such as if a sequence or pattern can still be identified from camera input or speech input even if the pattern is not explicitly indicated in any segment of the speech itself. For example, if people in a conference room are speaking sequentially in a particular direction related to their positions around a table (e.g., as determined based on microphone input and/or camera input), the pattern may be determined after the sequence is initially established by the first two participants speaking in sequence. Thus, the conclusion of one participant speaking (as may be identified either by silence after the speaking or using NLU to determine that certain spoken remarks conclude the participant's speech) may be used to trigger a switch to providing a video feed showing the next participant in the determined sequence or pattern.

Still in reference to FIG. 10, note that the GUI 1000 may also include one or more respective options 1008 for selecting a respective type of default video feed for the video conferencing system to provide, such as at block 906 above. The default feed may be provided, for example, when the system does not identify any participant as currently speaking for at least a threshold amount of time such as for at least ten seconds (e.g., five seconds being used in case there is only a momentary pause in one participants speech that is less than five seconds). The default feed may also be provided for still other reasons such as the system not being able to determine a video feed to provide (e.g., if a break in an identified pattern occurs). Thus, a respective one of the options 1008 may be selected to set the default video feed to be the video feed showing the conference organizer, the video feed showing whatever participant is determined by the participant to be speaking the most (e.g., based on word count or total length of time of talking during the conference), or the video feed showing whatever participant has organizational superiority or higher rank (e.g., a boss or other superior's video feed may be provided by default rather than a subordinate's video feed in a workplace setting).

It may now be appreciated that present principles provide for an improved computer-based user interface that increases the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
at least one processor; and
storage accessible to the at least one processor and comprising instructions executable by the at least one processor to:
facilitate a video conference;
based on input from at least one sensor, identify a first participant of the video conference for which to provide first video; and
based on the identification, switch from providing second video of a second participant as part of the video conference to providing the first video of the first participant as part of the video conference, the first video being different from the second video, the first participant being different from the second participant;
wherein the at least one sensor comprises a camera, and wherein the instructions are executable to:
identify the first participant for which to provide the first video based on input from the camera; and
wherein the input from the camera indicates the first participant as leaning toward the camera, the camera generating the first video.

2. The first device of claim 1, wherein the at least one sensor comprises a microphone, and wherein the instructions are executable to:
identify the first participant for which to provide the first video based on input from the microphone.

3. The first device of claim 2, wherein the input from the microphone indicates a third participant audibly referring to the first participant by name.

4. The first device of claim 2, wherein the input from the microphone indicates a question being asked.

5. The first device of claim 1, wherein the input from the camera indicates a third participant gesturing toward the first participant.

6. The first device of claim 1, wherein the input from the camera indicates the first participant as opening the first participant's mouth.

7. The first device of claim 1, wherein the input from the camera indicates the first participant making a gesture with one of the first participant's hands.

8. The first device of claim 1, wherein the first video is generated by a first camera and wherein the second video is generated by a second camera different from the first camera.

9. The first device of claim 1, wherein providing the first video comprises streaming the first video from the first device to a second device different from the first device.

10. The first device of claim 1, wherein providing the first video comprises presenting the first video on a display.

11. The first device of claim 1, wherein switching from providing the second video to providing the first video comprises providing a split screen window of the first video and a third video.

12. The first device of claim 11, wherein the third video is different from the second video, and wherein the third video shows a third participant that is discussing something with the first participant.

13. The first device of claim 1, wherein the instructions are executable to:
present a settings graphical user interface (GUI) on a display, the settings GUI being usable configure one or more settings related to video conferencing, the settings GUI comprising an option that is selectable to set the first device to, for plural instances in the future, determine a respective video to provide based on input from at least one sensor and then provide the respective video based on the determination of the respective video feed to provide.

14. A method, comprising:
facilitating, at a first device, a video conference;
determining, at the first device and based on input from at least one sensor, a first video feed for the video conference to provide; and
based on the determining, providing the first video feed as part of the video conference;
wherein the method further comprises:
based on not being able to determine, at the first device, a video feed to provide, providing a default video feed, the default video feed associated with one or more of: an organizer of the video conference, a first participant of the video conference who has been determined to speak more than at least one other participant during the video conference, a second participant determined to be a workplace superior.

15. The method of claim 14, wherein the first video feed comprises one or more of: a video feed of a whiteboard, a video feed of a slide presentation.

16. The method of claim 14, wherein the first video feed comprises a zoom-out of a second video feed.

17. The method of claim 14, comprising:
determining, based on the input from the at least one sensor, a pattern for plural participants sequentially introducing themselves as part of the video conference; and
sequentially providing, as part of the video conference, different video feeds over time according to the pattern so that a respective video feed associated with a respective participant is provided while the respective participant introduces themselves.

18. The method of claim 14, wherein providing the first video feed comprises providing a split screen window of the first video feed and a second video feed different from the first video feed, and wherein the split screen window shows, via the first and second video feeds, two participants discussing something back and forth.

19. At least one computer readable storage medium (CRSM) that is not a transitory signal, the computer readable storage medium comprising instructions executable by at least one processor to:
facilitate, at a first device, a video conference;
determine, based on input from at least one sensor, a first video feed for the video conference to provide; and
based on the determination, provide the first video feed as part of the video conference;
wherein the at least one sensor comprises a camera, and wherein the instructions are executable to:
determine the first video feed based on input from the camera, the input from the camera indicating a first participant going from not looking at a display to looking at the display.

20. The CRSM of claim 19, wherein the instructions are executable to:
present a settings graphical user interface (GUI), the settings GUI being usable configure one or more settings related to video conferencing, the settings GUI comprising an option that is selectable to set the at least one processor to, for plural instances in the future, determine a respective video feed to provide based on input from at least one sensor and then provide the respective video feed based on the determination of the respective video feed to provide.

* * * * *